US010755145B2

(12) United States Patent
Bhagavatula et al.

(10) Patent No.: US 10,755,145 B2
(45) Date of Patent: Aug. 25, 2020

(54) 3D SPATIAL TRANSFORMER NETWORK

(71) Applicant: CARNEGIE MELLON UNIVERSITY, Pittsburgh, PA (US)

(72) Inventors: Chandrasekhar Bhagavatula, Pittsburgh, PA (US); Khoa Luu, Pittsburgh, PA (US); Marios Sawides, Pittsburgh, PA (US); Chenchen Zhu, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 154 days.

(21) Appl. No.: 16/029,124

(22) Filed: Jul. 6, 2018

(65) Prior Publication Data

US 2019/0012578 A1    Jan. 10, 2019

Related U.S. Application Data

(60) Provisional application No. 62/604,454, filed on Jul. 7, 2017.

(51) Int. Cl.
| | |
|---|---|
| *G06K 9/62* | (2006.01) |
| *G06T 17/10* | (2006.01) |
| *G06K 9/00* | (2006.01) |
| *G06T 17/00* | (2006.01) |

(52) U.S. Cl.
CPC ....... *G06K 9/6262* (2013.01); *G06K 9/00248* (2013.01); *G06T 17/00* (2013.01); *G06T 17/10* (2013.01); *G06T 2210/44* (2013.01)

(58) Field of Classification Search
CPC .. G06K 9/6262; G06K 9/00248; G06T 17/00; G06T 17/10; G06T 2210/44

USPC ........................................................ 382/157
See application file for complete search history.

(56) References Cited

U.S. PATENT DOCUMENTS

| | | | | |
|---|---|---|---|---|
| 2005/0031195 A1* | 2/2005 | Liu | .................... | G06K 9/00275 382/154 |
| 2009/0052748 A1* | 2/2009 | Jiang | .................. | G06K 9/00208 382/118 |
| 2009/0132371 A1* | 5/2009 | Strietzel | ................. | G06Q 30/02 705/14.46 |
| 2011/0102553 A1* | 5/2011 | Corcoran | ........... | G06K 9/00281 348/50 |
| 2016/0371535 A1* | 12/2016 | Li | ....................... | G06K 9/00228 |
| 2019/0035149 A1* | 1/2019 | Chen | .................. | G06K 9/00248 |

FOREIGN PATENT DOCUMENTS

WO    WO-2017029488 A2 *   2/2017   ............... G06T 7/50

OTHER PUBLICATIONS

Jourabloo, "Pose-Invariant 3D Face Alignment", Jun. 11, 2015.*
(Continued)

*Primary Examiner* — Juan A Torres

(57) ABSTRACT

The present invention provides a novel approach to simultaneously extracting the 3D shape of the face and the semantically consistent 2D alignment using a 3D Spatial Transformer Network (3DSTN) to model both the camera projection matrix and the warping parameters of a 3D model. By utilizing a generic 3D model and a thin plate spline (TPS) warping function, subject-specific 3D shapes are able to be generated without the need for a large 3D shape basis.

16 Claims, 5 Drawing Sheets
(4 of 5 Drawing Sheet(s) Filed in Color)

(56) References Cited

OTHER PUBLICATIONS

Zhu, "Face Alignment Across Large Poses: A 3D Solution" Nov. 23, 2015.*

Feng, "Face Detection, Bounding Box Aggregation and Pose Estimation for Robust Facial Landmark Localisation in the Wild" Jun. 1, 2017.*

Kumar, "Face Alignment by Local Deep Descriptor Regression" Jan. 29, 2016.*

Richardson, "3D Face Reconstruction by Learning from Synthetic Data" Sep. 26, 2016.*

Liu, "On 3D Face Reconstruction via Cascaded Regression in Shape Space" Apr. 18, 2017.*

Dou, "End-to-end 3D face reconstruction with deep neural networks" Apr. 17, 2017.*

Bhagavatula , "Faster Than Real-time Facial Alignment: A 3D Spatial Transformer Network Approach in Unconstrained Poses" Sep. 8, 2017.*

Chui, H., and Rangarajan, A., "A New Point Matching Algorithm for Non-Rigid Registration," Computer Vision and Image Understanding, 89: 114-141(2003).

Heo, J., and Sawides, M., "Gender and Ethnicity Specific Generic Elastic Models from a Single 2D Image for Novel 2D Pose Face Synthesis and Recognition," IEEE Transactions on Pattern Analysis and Machine Intelligence, 34(12): 2341-2350, Dec. 2012.

Prabhu, U. et. al., "Unconstrained Pose-Invariant Face Recognition Using 3D Generic Elastic Models," IEEE Transactions on Pattern Analysis and Machine Intelligence, 33(10): 1952-1961, Oct. 2011.

Bookstein, F. L., "Principal Warps: Thin-Plate Splines and the Decomposition of Deformations," IEEE Transactions on Pattern Analysis and Machine Intelligence, vol. 11(6): 567-585, Jun. 6, 1989.

* cited by examiner

3D SPATIAL TRANSFORMER NETWORK

RELATED APPLICATIONS

This application claims the benefit of U.S. Provisional Application No. 62/604,454, filed Jul. 7, 2017.

BACKGROUND

Robust face recognition and analysis are contingent upon accurate localization of facial features. When modeling faces, the landmark points of interest consist of points that lie along the shape boundaries of facial features, e.g. eyes, lips, mouth, etc. When dealing with face images collected in the wild, facial occlusion of landmarks becomes a common problem for off-angle faces. Predicting the occlusion state of each landmarking point is challenging due to variations of objects in faces, e.g. beards and mustaches, sunglasses and other noisy objects. Additionally, face images of interest usually contain off-angle poses, illumination variations, low resolutions, and partial occlusions.

Many complex factors affect the appearance of a facial image in real-world scenarios. Providing tolerance to these factors is difficult. Among these factors, pose is often the most important factor. As facial pose deviates from a frontal view, most face recognition systems have difficulty in performing robustly. To handle a wide range of pose changes, it becomes necessary to utilize 3D structural information of faces. Many of the existing 3D face modeling schemes have drawbacks, such as computation time and complexity. This causes difficulty when applying these schemes in real-world, large scale, unconstrained face recognition scenarios.

While estimating a 3D model from images is not a new problem, the challenging task of modeling objects from a single image has always posed a challenge. This is, of course, due to the ambiguous nature of images where depth information is removed. Recently, deep learning using convolutional neural networks (CNNs) has been used successfully to extract salient information from images. There have been many explorations into how to best use CNNs for modeling objects in 3 dimensions. Many of these approaches are aimed creating a depth estimation for natural images. While the results on uncontrolled images are impressive, the fact that these models are general means they tend to be less effective when applied to specific objects, such as faces. Often, the depth estimate for faces in the scene tends to be fairly flat. By limiting the scope of the method, the resulting estimated 3D model can be made much more accurate. A 3D model of the face can be used to frontalize faces in unseen images with the end goal of improving face recognition by limiting the variations required to be learned by the matcher. However, this approach requires landmarks on the input face in the same fashion as other methods.

A 2D approach to landmarking inevitably suffers from the problem of visibility and self-occlusion. The problem of landmark marching, where landmarks tend to move to the visible boundary, can cause issues when estimating 3D models from 2D alignment. However, this problem can be alleviated by using a 3D model of the face in the alignment step. Such methods make use of an underlying 3D Morphable Model (3DMM) and try to fit the model to the input image to find the required landmarks. This requires a basis, such as the popular Basel Face Model (BFM). However, the BFM is only created from a set of 100 male and 100 female scans. A new 3D model is generated as a combination of the example faces. As any basis can only recreate combinations of the underlying samples, the capability of these models is severely limited in their ability to fit outlier faces or expressions not seen before. This, a key flaw in many approaches that rely on a 3DMM is that enough examples of the data required to model unseen samples. However, in the case of 3D faces, most datasets are very small.

SUMMARY

To address these problems, the present invention uses a smooth warping function using thin plate splines (TPS) to warp mean shapes to fit the input facial image and generate new 3D shapes. As such, any new face can be modeled, even if its shape cannot be reconstructed by the BFM.

The present invention uses a simple mean shape of a generic face and performs a parametric, non-linear warping of that shape through alignment on the input facial image to model any unseen examples. The method is efficiently implemented using an end-to-end deep learning framework allowing for the alignment and 3D modeling tasks to be codependent. This ensures that alignment points are semantically consistent across changing poses of the object, which also allows for more consistent 3D model generation and frontalization on images in the wild.

The method requires only a single pass through the network, thereby achieving faster than real-time processing of images with state-of-the-art performance over other 2D and 3D approaches to alignment.

DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

To model how a face changes from viewpoint to viewpoint, it is necessary to have both the true 3D model of the subject in the image and the properties of the camera used to capture the image, usually in the form of a camera projection matrix. However, knowledge of the true 3D model and the camera projection matrix are almost always not available.

In the present invention, the unknown TPS parameters needed to generate the 3D model and the camera projection matrix parameters are estimated in a similar fashion. Both the warping parameters, a TPS warp in this case, and the camera projection parameters, can be estimated from deep features generated from the 2D input facial image using a CNN. The TPS parameters can be used to warp a mean model of a face to match what the network estimates the true 3D shape to be, and the camera projection parameters can be used to texture the 3D coordinates from the 2D image.

Additionally, the pose of the face can be determined from the camera parameters, allowing for a visibility map to be generated for the 3D model. This allows the texturing of vertices that are visible in the image as opposed to vertices that are occluded by the face itself. The architecture of the model is shown in FIG. 1, and detail is provided below regarding how to create differentiable modules to utilize the camera projection and TPS parameters that are estimated by the deep network to warp and project a 3D model to a 2D image plane for texture sampling.

As an overview, a deep neural network is trained to fit 3D models based on the inputs. The training data consists of synthetic facial images which are rotated to train the model such that the location of a set of landmarks is known. In one preferred embodiment of the invention, 77 landmarks are used. The present invention operates under the assumption that the facial shape of any person can be modeled as a thin plate spline warp of a generic 3D mean facial shape.

Figure 1:
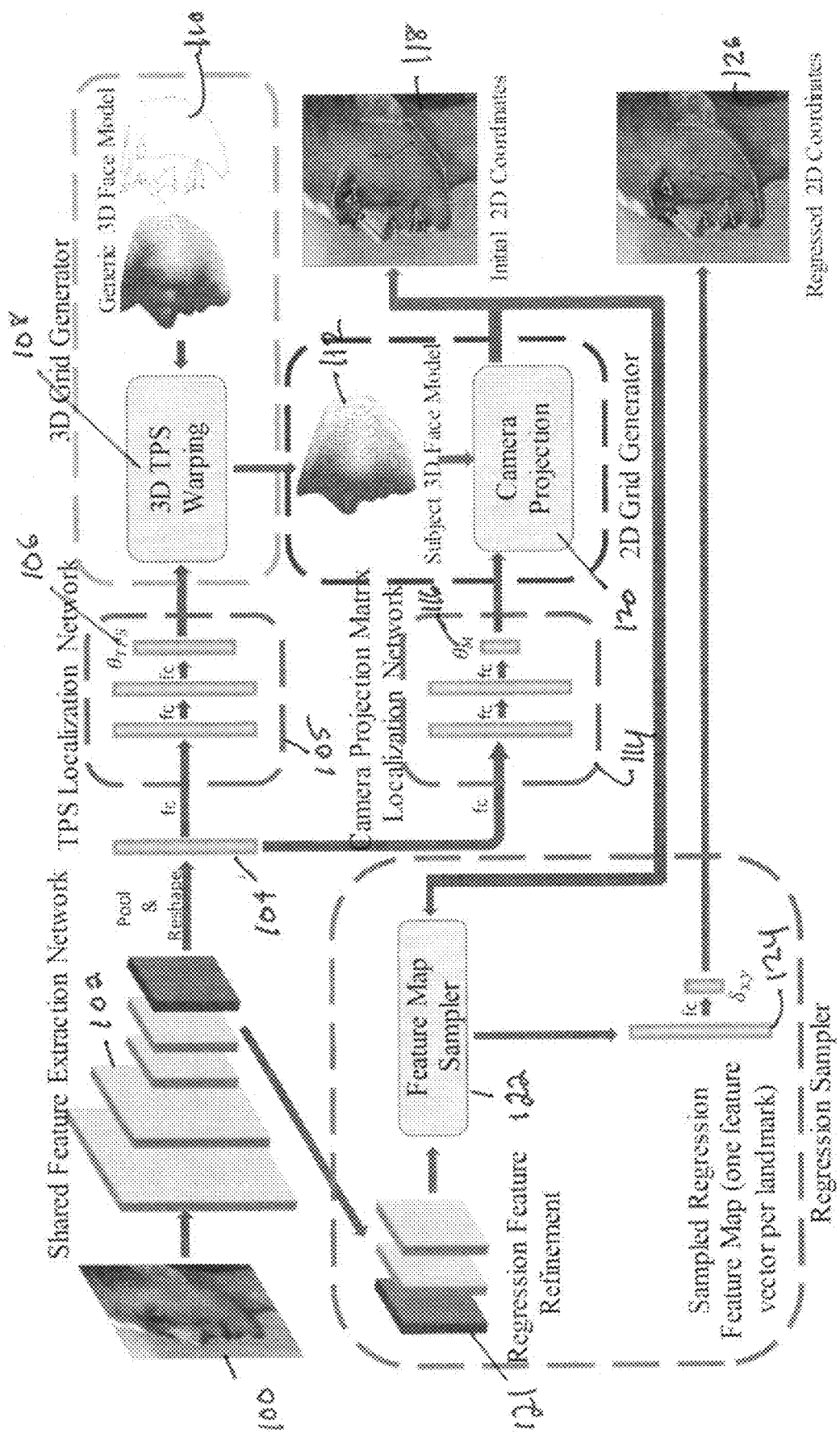
FIG. 1 shows the network design of the 3D thin plate spline spatial transformer for facial alignment.

With reference to FIG. 1, to generate a 3D model from a single 2D image of a face at any pose, the 2D image 100 is first analyzed to detect faces therein, and a facial image is extracted. The method is agnostic as to which face detection method is used to crop out the face from the image. Any one of a number of well-known facial detection algorithms may be used. Additionally, a facial bounding box may be manually placed within the image to isolate faces.

The facial images are passed through a deep convolutional neural network 102 that consists of a plurality of convolution layers. The convolution layers being used are traditional convolution layers which take in some input, usually an image or some set of channels and transforms the input using a matrix. The resulting output is passed to the next layer in the network. The optimal number of convolutional layers may be determined experimentally. Normally, the parameters of the TPS warp function could be derived by comparing a 3D shape of the face to the 3D mean face. However, because a 2D image of the face does not provide a 3D shape, the CNN is used to estimate the parameters which are used to warp them 3D mean face. In certain embodiments, the location of obscured landmarks on the 2D image of the face may be detected by the CNN. The output of the CNN is typically a multi-channel tensor.

The tensor 104 is reshaped as a vector and used as input to the fully-connected TPS localization network 105, a neural network, having a plurality of fully-connected layers, to generate the estimated TPS parameters ($\theta_{TPS}$) 106. Once the TPS parameters 106 have been estimated, the TPS warp function 108 is applied to a generic mean 3D model of a face 110 to produce a 3D model 112 of the face from the 2D image. The result of applying the TPS warp function to the 3D mean face is that the defined landmarks on the 3D model will be adjusted to positions corresponding to the identified landmarks in the 2D image. Thereby, a 3D model having the contours of the face from the 2D image, but without texture information is produced.

Texture, which, in certain embodiments, consists of color, may be added by mapping the RGB values of points in the 2D image to their corresponding points in the 3D model. To accomplish this, the 3D model is projected from the 3D domain to the 2D image domain using a camera projection matrix 116. The camera projection matrix 116 is generated by passing the tensor 104 generated by the CNN 102, through a fully-connected neural network 114 having a plurality of fully-connected layers. Once a projection is complete, the location of all landmarks in 2D space are known, and can be used to map texture values to the 3D model by taking the RGB value of each pixel in the 2D input facial image and finding its corresponding point in the 2D projection. The result of this process is the initial 2D coordinates 118, shown in FIG. 1. Once the 2D coordinates of all the landmarks is known they can be used, for example, for facial recognition or to obtain the same landmarks regardless of the pose of the face in the 2D image.

Once the subject 3D face model 112 has been obtained, texture information can be added. The camera projection matrix 116, shown as $\theta_M$ 116 in FIG. 1, can also be derived using tensor 104 as the input to camera projection matrix localization network 114, a fully-connected neural network. The camera projection function 120, using camera project matrix 116 as input, projects the subject 3D face model 112 into the 2D image domain, resulting in the initial 2D coordinates 118.

Tensor 104 may further be used as input to a regression feature refinement neural network which may be used to refine the location of the set of landmarks on the initial 2D coordinate projection 118. Regression feature refinement neural network 121 is a convolutional neural network which produces input parameters to the feature map sampler 122. Feature map sampler 122 takes landmark locations from the initial 2D coordinates 118 and samples the feature map at the locations of the landmarks, to produce one feature vector per landmark. The feature vector is passed through a fully connected layer 124 that predicts the $\Delta X$ and $\Delta Y$ locations for each landmark. The coordinates of each landmark are then adjusted to produce regressed 2D coordinates 126, shown in FIG. 1.

Figure 2:
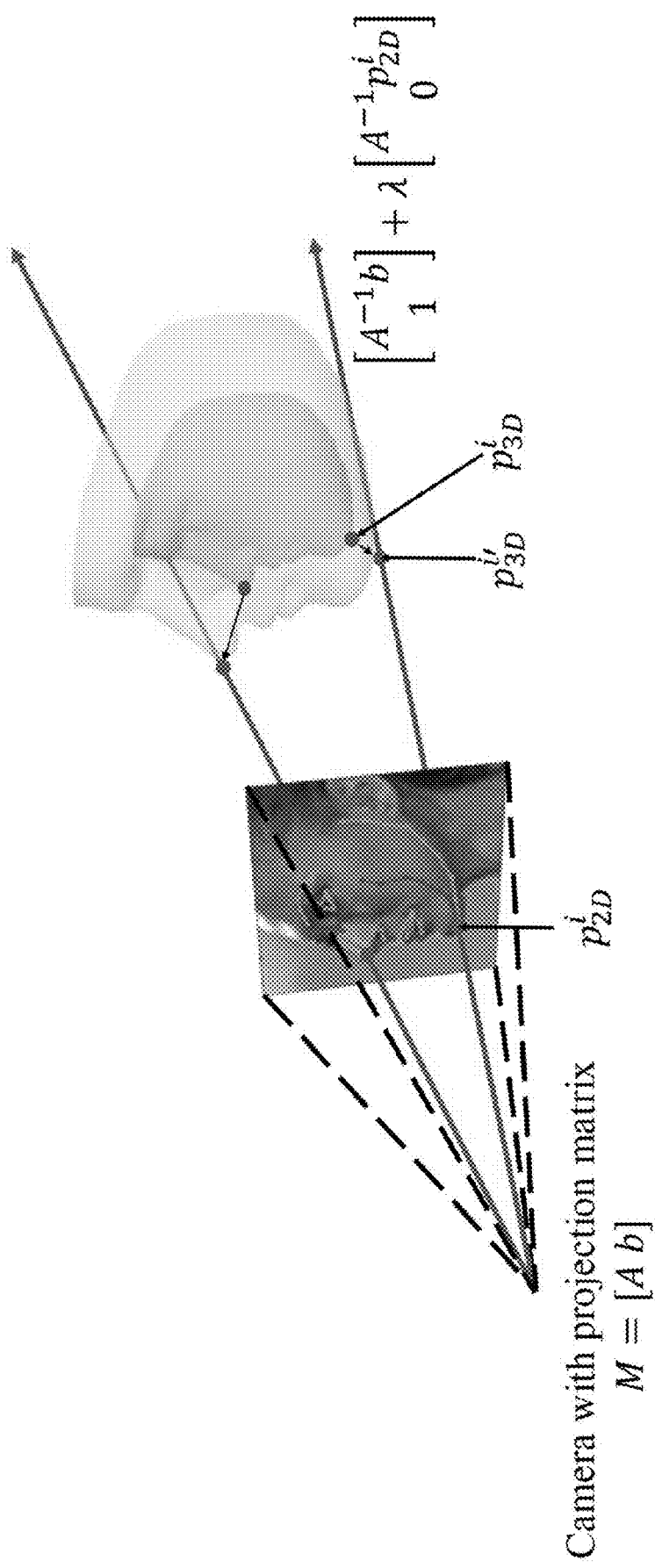
FIG. 2 shows the back projection of rays through image landmarks.

The camera projection matrix 116 may be used to relate the regressed 2D coordinates to the 3D model 112 to generate a 3D model having the refined locations of the landmarks. This process is shown in FIG. 2.

Camera Projection Transformers

To be able to perform end-to-end training of a network designed to model 3D transformations of the face, a differentiable module that performs a camera projection must be created. This will be part of the grid generator portion of the spatial transformer. Modeling how a 3D point will map to the camera coordinates is expressed by the well-known camera projection equation:

$$P_c \approx Mp_w \qquad (1)$$

where $p_c$ is the homogenous 2D point in the camera coordinate system, $p_w$ is the homogenous 3D point in the world coordinate system, and M is a camera projection matrix. In some embodiments, the camera projection matrix is a 3×4 matrix. This relationship is only defined up to scale due to the ambiguity of scale present in projective geometry, hence the $\approx$ instead of a hard equaltiy. The camera projection matrix has only 11 degrees of freedom since it is only defined up to scale as well. Therefore, this module takes in the 11 parameters estimated by a previous layer as the input in the form of a length 11 vector, a. To perform back-propagation on the new grid generator, the derivative of the generated grid with respect to a must be computed.

Since Eqn. (1) is only defined up to scale, the final output of this module will have to divide out the scale factor. By first rewriting the camera projection matrix as:

$$M = \begin{bmatrix} a_1 & a_2 & a_3 & a_4 \\ a_5 & a_6 & a_7 & a_8 \\ a_9 & a_{10} & a_{11} & 1 \end{bmatrix} = \begin{bmatrix} m_1^T \\ m_2^T \\ m_3^T \end{bmatrix} \qquad (2)$$

where $a_i$ is the $i^{th}$ element of a, the final output of the camera projection module can be written as:

$$O = \begin{bmatrix} x_c \\ y_c \end{bmatrix} = \begin{bmatrix} \frac{m_1^T p_w}{m_3^T p_w} \\ \frac{m_2^T p_w}{m_3^T p_w} \end{bmatrix} \quad (3)$$

The gradient with respect to each of the rows of M can be shown to be:

$$\frac{\delta O}{\delta m_1^T} = \begin{bmatrix} \frac{p_w^T}{m_3^T p_w} \\ 0 \end{bmatrix} \quad (4.1)$$

$$\frac{\delta O}{\delta m_2^T} = \begin{bmatrix} 0 \\ \frac{p_w^T}{m_3^T p_w} \end{bmatrix} \quad (4.2)$$

$$\frac{\delta O}{\delta m_3^T} = \begin{bmatrix} \frac{-p_w^T(m_1^T p_w)}{(m_3^T p_w)^2} \\ \frac{-p_w^T(m_2^T p_w)}{(m_3^T p_w)^2} \end{bmatrix} \quad (4.3)$$

Using the chain rule, the gradient of the loss of the network with respect to the input can be found as:

$$\frac{\delta L}{\delta a} = \begin{bmatrix} \left(\frac{\delta L}{\delta O}\frac{\delta O}{\delta m_1^T}\right)^T \\ \left(\frac{\delta L}{\delta O}\frac{\delta O}{\delta m_2^T}\right)^T \\ \left(\frac{\delta L}{\delta O}\frac{\delta O}{\delta m_3^T}\right)^T \end{bmatrix} \quad (5)$$

Because M is only defined up to scale, the last element of M can be defined to be a constant, which means that only the first 11 elements of this gradient are actually used to perform the back-propagation on a. Because M relates many pairs of 2D and 3D points, the gradient is computed for every pair and added together to give the final gradient used for updating a.

3D Thin Plate Spline Transformers

When modeling the 3D structure of a face, a generic model cannot represent the variety of shapes that might be seen in an image. Therefore, some method of warping a model must be used to allow the method to handle unseen shapes. Thin Plate Spline (TPS) warping has been used by many applications to great effect. TPS warps have the very desirable feature of providing a closed form of a smooth, parameterized warping, given a set of control points and desired destination points. 2D TPS Spatial Transformers could lead to good normalization of nonlinearly transformed input images. Applying a TPS to a 3D set of points follows a very similar process. The TPS parameters would be estimated from a deep network of some sort and passed as input to a 3D grid generator module.

A 3D TPS function is of the form:

$$f_{\Delta_x}(x, y, z) = \begin{bmatrix} b_{1x} \\ b_{2x} \\ b_{3x} \\ b_{4x} \end{bmatrix}^T \begin{bmatrix} 1 \\ x \\ y \\ z \end{bmatrix} + \sum_{j=1}^n w_{jx} U(|c_j - (x, y)|) \quad (6)$$

where $b_{1x}$, $b_{2x}$, $b_{3x}$, box and $w_{jx}$ are the parameters of the function, $c_j$ is the $j^{th}$ control point used in determining the function parameters, and $U(r)=r^2 \log r$. This function is normally learned by setting up a system of linear equations using the known control points, $c_j$ and the corresponding points in the warped 3D object. The function finds the change in a single coordinate, the change in the x-coordinate in the case of Eqn. 6. Similarly, one such function is created for each dimension, i.e. $f_{\Delta_x}(x, y, z)$, $f_{\Delta_y}(x, y, z)$ and $f_{\Delta_z}(x, y, z)$. The 3D TPS module would then take in the parameters for all three of these functions as input and output the newly transformed points on a 3D structure as:

$$O = \begin{bmatrix} x' \\ y' \\ z' \end{bmatrix} = \begin{bmatrix} f_{\Delta_x}(x, y, z) \\ f_y(x, y, z) \\ f_{\Delta_z}(x, yz) \end{bmatrix} + \begin{bmatrix} x \\ y \\ z \end{bmatrix} \quad (7)$$

As such, the 3D TPS module must have all of the 3D vertices of the generic model and the control points on the generic model as fixed parameters specified from the start. This will allow the module to warp the specified model by the warps specified by the TPS parameters.

The gradient of the loss with respect to the input parameters must be computed to perform back-propagation on this module. The chain rule can be used to find this by computing the gradient of the output with respect to the input parameters. Since each 3D vertex in the generic model will give one 3D vertex as an output, it is easier to compute the gradient on one of these points, $p_i=(x_i, y_i, z_i)$, first. This can be shown to be:

$$\frac{\delta O}{\delta \theta_{\Delta_x}} = \begin{bmatrix} 1 & 0 & 0 \\ x_i & 0 & 0 \\ y_i & 0 & 0 \\ z_i & 0 & 0 \\ U(|c_1 - (x_i, y_i, z_i)|) & 0 & 0 \\ \vdots & \vdots & \vdots \\ U(|c_n - (x_i, y_i, z_i)|) & 0 & 0 \end{bmatrix}^T \quad (8)$$

where $\theta_{\Delta_x}$ are the parameters of $f_{\Delta_x}$. Similarly, the gradients for $\theta_{\Delta_y}$ and $\theta_{\Delta_z}$ are the same with only the non-zero values in either the second or third row respectively. The final gradient of the loss with respect to the parameters can be computed as:

$$\frac{\delta O}{\delta \theta_{\Delta_x}} = \frac{\delta L}{\delta O}\frac{\delta O}{\delta \theta_{\Delta_x}} \quad (9)$$

Since this is only for a single point, once again the gradient can be computed for every point and added for each set of parameters to get the final gradient for each set of parameters that can be used to update previous layers of the network.

Warped Camera Projection Transformers

To make use of the TPS warped 3D points in the camera projection module of the transformer network, the module must take in as input the warped coordinates. This means that such a module would also have to do back-propagation on the 3D coordinates as well as the camera projection parameters. Since the method to compute the gradient of the loss with respect to the camera projection parameters was already explained, all that must be done is computing the gradient of the loss with respect to the 3D coordinates in this module. Taking the derivative of the output in Eqn. 3 with respect to the 3D point, will results in:

$$\frac{\delta O}{\delta p_w} = \begin{bmatrix} \frac{m_1^T}{m_3^T p_w} - \frac{m_1^T p_w}{m_3^T p_w^2} m_3^T \\ \frac{m_2^T}{m_3^T p_w} - \frac{m_2^T p_w}{m_3^T p_w^2} m_3^T \end{bmatrix} \quad (10)$$

However, because $p_w$ is in homogenous coordinates and only the gradient with respect to the x, y and z coordinates are needed, the actual gradient becomes:

$$\frac{\delta O}{\delta p_w'} = \begin{bmatrix} \frac{m_1'^T}{m_3^T p_w} - \frac{m_1^T p_w}{m_3^T p_w^2} m_3'^T \\ \frac{m_2'^T}{m_3^T p_w} - \frac{m_2^T p_w}{m_3^T p_w^2} m_3'^T \end{bmatrix} \quad (11)$$

where:

$$p_w' = \begin{bmatrix} x_w \\ y_w \\ z_w \end{bmatrix}, m_i' = \begin{bmatrix} m_{i_1} \\ m_{i_2} \\ m_{i_3} \end{bmatrix} \quad (12)$$

and $m_{ij}$ is the $j^{th}$ element of $m_i$. This gradient is computed for every 3D point independently and used in the chain rule to compute:

$$\frac{\delta L}{\delta p_w} = \frac{\delta L}{\delta O} \frac{\delta O}{\delta p_w} \quad (13)$$

which can then be used to perform back-propagation on each $p_w$.

2D Landmark Regression

To further improve the landmark accuracy, the network can be extended with a landmark refinement stage. This stage treats the projected 2D coordinates from the previous stage as initial points and estimates the offsets for each point (landmark). To extract the feature vector for each point, a 3×3 convolution layer is attached on top of the last convolution layer in the base model, followed by a 1×1 convolution layer for more nonlinearity, resulting in a feature map with D channels. Then each initial point is projected onto this feature map and its D-dimensional feature vector is extracted along the channel direction. Notice that the initial points are often not aligned with the grids on the feature map. Therefore, their feature vectors are sampled with bi-linear interpolation.

Given the feature vector for each landmark, it goes through a fully-connected (FC) layer to output the offsets, i.e. ΔX and ΔY. The offsets are then added to the coordinates of the initial location. For each landmark, an independent FC layer is used. The FC layer is not shared for all landmarks because each landmark should have unique behavior of offsets. For example, the center of the eye may move left after regression, whereas the corner of the eye may move right. Additionally, sometimes two initial landmarks may be projected to the same location due to a certain pose. These points should be moved to different locations even when they have the same feature vector.

3D Model Regression From 2D Landmarks

Once the 2D regression is performed, the mapping between the 3D model and the 2D landmarks is broken. While this is not necessarily a problem in the case of sparse facial alignment, if a denser scheme is needed, the entire model would have to be retrained. To avoid this, a new 3D model is created that maps to these 2D landmarks by finding a new set of 3D coordinates that project to the new 2D landmarks, and warping the 3D model to fit these new points. To find the new 3D coordinates, rays can be back-projected through each of the 2D landmarks through 3D space using the camera projection matrix previously estimated. This process is shown in FIG. 2. The equation for the ray of points associated with a given homogeneous 2D point, $p_{2D}^i$ is defined as:

$$p_{3D}^{i'} = \begin{bmatrix} A^{-1}b \\ 1 \end{bmatrix} + \lambda \begin{bmatrix} A^{-1} p_{2D}^i \\ 0 \end{bmatrix} \quad (14)$$

where A and b are the first three and the last column of the estimated camera projection matrix respectively.

Figure 3:
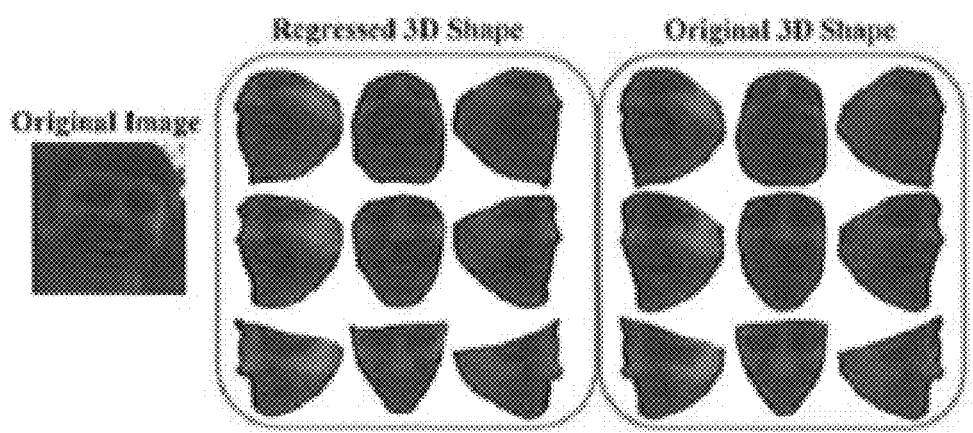
FIG. 3 shows 3D renderings of an input face with a smiling expression, a regressed 3D model and a non-smiling rendering of the image.

These rays represent all possible points in 3D that could project to the determined locations in the image. The closest point, on the ray to the original 3D coordinate, $p_{3D}^i$, is identified to use as the new 3D point, as shown in FIG. 2. These new correspondences are used to perform a TPS warping of the model. After this warping, the landmark points on the model will project to exactly the regressed 2D landmarks, thus recovering the mapping between the 3D model and the 2D image. This new model can then be projected onto the image to generate a much more accurate texturing of the 3D model. This same style of warping can be used to move the 3D coordinates to any chosen place. This means neutralizing out expressions, especially smiles, is very easy to do by using the texture from the regressed 3D shape. While the non-smiling shape will not be as accurate, due to the fact that a non-smiling image was not seen, it still gives convincing qualitative results, as seen in FIG. 3, which shows 3D renderings of input face with a smiling expression. The resulting regressed 3D model (green box) maintains the smile and is very similar to the input image while the same texture applied to the original shape (red box) suffers a small degradation in shape but allows for a non-smiling rendering of the input image.

Figure 4:
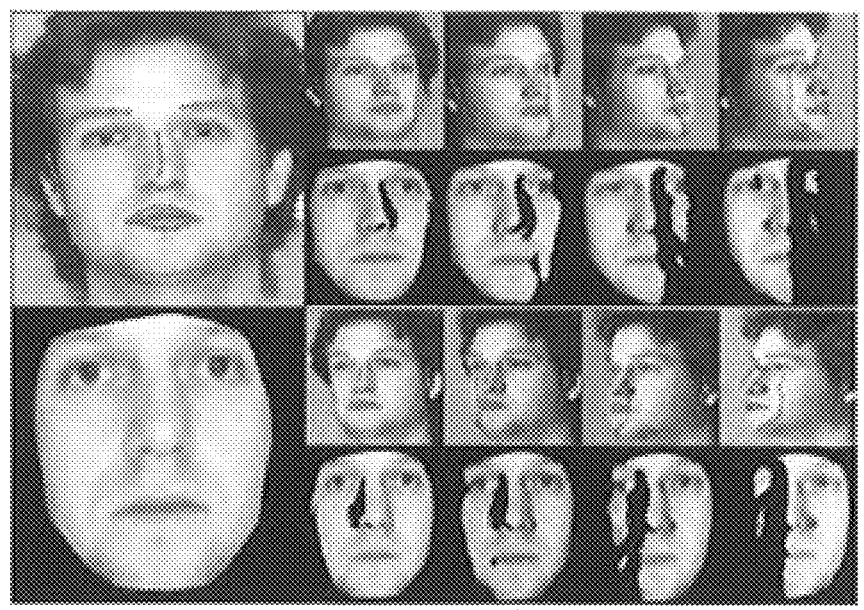
FIG. 4 shows a subject from a well-known database landmarked and frontalized by the method of the present invention at various poses.
Figure 5:
FIG. 5 shows images in the wild from another well-known data set, 3D landmarks estimated from the input image; and a 3D model generated from the input image.

The present invention specifies a method using 3D Spatial Transformer Networks with TPS warping to generate both a 3D model of the face and accurate 2D landmarks across large pose variation. The limited data used in the generation of a 3DMM can mean that unseen face shapes cannot be modeled. By using a TPS warp, any potential face can be modeled through a regression of 2D landmarks, of which there is much more data available. This approach leads to more accurate and consistent landmarks over other 2D and 3D methods. It should be noted that for computational efficiency, the tensor 104 generated by CNN 102 is used as the input to the TPS localization network, the camera projection matrix localization network and the regression feature refinement network. However, in alternative embodiments, a different CNN may be used to generate the input to each of the fully-connected neural networks FIG. 4 shows a subject from a well-known database landmark and frontalized by the method of the present invention at various poses. Landmarks found by the method are overlaid in green if they were determined to be a visible landmark and blue if self-occluded. The nonvisible regions of the face are determined by the estimated camera center in the estimated 3D shape. FIG. 5 (a & d) show images in the wild from another well-known data set; (b & d) show 3D landmarks estimated from the input image; and (e & f) show a 3D model generated from the input image.

The system and method presented herein allows for the creation of a 3D model of the face from a 2-D image without the need for a large 3D shape basis, by estimating the parameters of a TPS warping function. The invention may be implemented utilizing any processing means in any combination of software components implementing the functions described herein.

We claim:

1. A computer implemented method comprising:
receiving an input facial image;
generating a tensor comprising plurality of channels representing features in the input facial image using a deep convolutional neural network having a plurality of convolutional layers;
inputting the tensor to a TPS localization network to estimate a set of TPS parameters; and
warping a 3D model of a generic mean face using the estimated TPS parameters as input to a TPS warping function, the TPS warping function adjusting defined landmarks on the 3D model of the generic mean face to create a 3D model of the input facial image.

2. The method of claim 1 further comprising:
analyzing the input facial image to estimate a set of camera projection parameters;
using the camera projection parameters to project landmarks in the 3D model of the input facial image to a 2D image domain to create a 2D projection of the 3D model of the input facial image; and
mapping texture information from points in the input facial image to corresponding points in the 2D projection of the 3D model of the input facial image.

3. The method of claim 1 wherein estimating the set of camera projection parameters further comprises:
using the tensor as input to a camera projection matrix localization network to generate a camera projection matrix.

4. The method of claim 1 wherein the deep convolutional neural network is trained by rotating a set of 2D synthetic facial images such that locations in the 2D facial images corresponding to the locations of a plurality of landmarks defined on the 3D mean generic face can be determined.

5. The method of claim 2 further comprising:
analyzing the input facial image with a neural network to estimate a feature map;
sampling the feature map at the location of each landmark in the 2D projection to obtain a feature vector for each 2D projected landmark;
estimating a change in 2D coordinates for each 2D projected landmark; and
applying the change in the 2D coordinates for each 2D projected landmark.

6. The method of claim 3 wherein the TPS localization network comprises a first neural network having a plurality of fully-connected layers.

7. The method of claim 5 further comprising:
estimating the location of a set of landmark coordinates in the 3D model of the input facial image that map to the changed locations of the coordinates in the 2D projection.

8. The method of claim 6 wherein the camera projection matrix localization comprises a second neural network having a plurality of fully-connected layers.

9. The method of claim 6 wherein the feature map is generated by passing a final layer of the convolutional neural network through a third neural network having a plurality of fully-connected layers.

10. An apparatus comprising:
a processor executing software, the software performing the functions of:
generating a multi-channel tensor representing features in an input facial image using a deep convolutional neural network having a plurality of convolutional layers;
using the tensor as input to a thin plate spline (TPS) localization network to estimate a set of TPS parameters;
inputting the estimated TPS parameters to a 3D TPS warping function to warp a 3D model of a generic mean face to create a 3D model of the input facial image;
using the tensor as input to a camera projection matrix localization network to estimate a camera projection matrix;
using the camera projection matrix, projecting the 3D model of the input facial image to a 2D image domain to create a 2D projection of the 3D model of the input facial image, the projection having 2D projected landmarks corresponding to the landmarks in the 3D model of the facial image; and
mapping texture information from points in the input facial image to corresponding points in the 2D projection.

11. The apparatus of claim 10 wherein the TPS localization network comprises a neural network having a plurality of fully connected layers.

12. The apparatus of claim 10 wherein the camera projection matrix localization network comprises a neural network having a plurality of fully connected layers.

13. The apparatus of claim 10 further comprising creating a feature map using as input a final layer of the convolutional neural network as the first layer in a fully-connected neural network.

14. The apparatus of claim 10 wherein the convolutional neural network is trained by rotating a set of 2D synthetic facial images such that locations in the 2D facial images corresponding to the locations of a plurality of landmarks defined on the 3D mean generic face can be determined.

15. The apparatus of claim 13 the software performing the further functions of:
sampling the feature map at the location of each landmark in the 2D projection to obtain a feature vector for each 2D projected landmark;
estimating a change in 2D coordinates for each 2D projected landmark; and
applying the change in the 2D coordinates for each 2D projected landmark.

16. The apparatus of claim 15, the software performing the further function of estimating the location of a set of landmark coordinates in the 3D model of the input facial image that map to the changed locations of the coordinates in the 2D projection.

\* \* \* \* \*

UNITED STATES PATENT AND TRADEMARK OFFICE
CERTIFICATE OF CORRECTION

PATENT NO. : 10,755,145 B2  
APPLICATION NO. : 16/029124  
DATED : August 25, 2020  
INVENTOR(S) : Chandrasekhar Bhagavatula et al.

Page 1 of 1

It is certified that error appears in the above-identified patent and that said Letters Patent is hereby corrected as shown below:

On the Title Page

(72) Inventors; Please replace "Marios Sawides" with --Marios Savvides--

Signed and Sealed this  
Third Day of November, 2020

Andrei Iancu  
*Director of the United States Patent and Trademark Office*